United States Patent
Lorca Hernando

(10) Patent No.: US 9,654,261 B2
(45) Date of Patent: May 16, 2017

(54) METHOD AND A SYSTEM FOR BEAM COORDINATION BETWEEN BASE STATIONS IN WIRELESS CELLULAR SYSTEMS AND COMPUTER PROGRAM THEREOF

(71) Applicant: TELEFONICA, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 271 days.

(21) Appl. No.: 14/516,078

(22) Filed: Oct. 16, 2014

(65) Prior Publication Data

US 2015/0103784 A1    Apr. 16, 2015

(30) Foreign Application Priority Data

Oct. 16, 2013    (EP) .................................... 13382410

(51) Int. Cl.
| | |
|---|---|
| *H04L 5/00* | (2006.01) |
| *H04J 11/00* | (2006.01) |
| *H04W 72/08* | (2009.01) |
| *H04B 7/024* | (2017.01) |
| *H04W 72/04* | (2009.01) |

(52) U.S. Cl.
CPC .......... *H04L 5/0032* (2013.01); *H04B 7/024* (2013.01); *H04J 11/0056* (2013.01); *H04W 72/082* (2013.01); *H04W 72/046* (2013.01)

(58) Field of Classification Search
CPC .................................................... H04L 5/0032
See application file for complete search history.

(56) References Cited

U.S. PATENT DOCUMENTS

| | | | |
|---|---|---|---|
| 2009/0201839 A1 | 8/2009 | Smee et al. | |
| 2011/0103494 A1* | 5/2011 | Ahmadi | H04L 5/0007 375/260 |
| 2012/0207025 A1* | 8/2012 | Barbieri | H04L 1/20 370/236 |
| 2012/0282964 A1* | 11/2012 | Xiao | H04B 7/024 455/515 |
| 2013/0072243 A1 | 3/2013 | Yu et al. | |
| 2013/0088986 A1* | 4/2013 | Xiao | H04W 72/0426 370/252 |
| 2013/0109420 A1* | 5/2013 | Nilsson | H04B 7/024 455/501 |
| 2013/0156120 A1* | 6/2013 | Josiam | H04B 7/0697 375/260 |

(Continued)

FOREIGN PATENT DOCUMENTS

EP    2 549 814 A1    1/2013

OTHER PUBLICATIONS

Extended European Search Report of EP 13382410.2 dated Apr. 8, 2014.

*Primary Examiner* — Robert M Morlan
*Assistant Examiner* — Nourali Mansoury
(74) *Attorney, Agent, or Firm* — Sughrue Mion, PLLC

(57) ABSTRACT

A method involving coordinating resources between a victim and an aggressor base station in massive MIMO systems, whereby only those specific beams involved in the interference scenario are coordinated in time and/or frequency domains without affecting other resources committed to other users as well as legacy users. Also disclosed is a system and computer program configured to implement the method.

14 Claims, 14 Drawing Sheets

(56) References Cited

U.S. PATENT DOCUMENTS

2013/0201975 A1* 8/2013 Chen ................. H04W 72/0446
370/336
2013/0281143 A1* 10/2013 Nentwig ........... H04W 72/1231
455/501

* cited by examiner

|  | Cell #1 | Cell #2 | Cell #3 | ... | Cell #N |
|---|---|---|---|---|---|
| User #1 | $BI_{11}$ | $BI_{12}$ | $BI_{13}$ | ... | $BI_{1N}$ |
| User #2 | $BI_{21}$ | $BI_{22}$ | $BI_{23}$ | ... | $BI_{2N}$ |
| ... | ... | ... | ... | | ... |
| User #M | $BI_{M1}$ | $BI_{M2}$ | $BI_{M3}$ | ... | $BI_{MN}$ |

$BI_{ij}$: BEAM INDICATOR FROM CELL J INTERFERING USER I

AUTOMATIC INTERFERENCE RELATION TABLE (AIRT)

FIG. 5

METHOD AND A SYSTEM FOR BEAM COORDINATION BETWEEN BASE STATIONS IN WIRELESS CELLULAR SYSTEMS AND COMPUTER PROGRAM THEREOF

FIELD OF THE ART

The present invention generally relates to the field of inter-cell interference coordination in wireless cellular systems, and more specifically to a method, a system and a computer program for beam coordination between base stations in wireless cellular systems comprising massive antenna arrays at the base stations.

BACKGROUND OF THE INVENTION

Long-Term Evolution (LTE) is the next step in cellular Third-Generation (3G) systems, which represents basically an evolution of present mobile communications standards, such as Universal Mobile Telecommunication System (UMTS) and Global System for Mobile Communications (GSM) [1]. It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth.

LTE-Advanced (LTE-A), an evolution of LTE, is being standardized in LTE Release 10 and beyond. It is aimed at fulfilling International Mobile Telecommunications (IMT)-Advanced requirements, whose capabilities go beyond those of IMT-2000 and include enhanced peak data rates to support advanced services and applications (100 Mbps for high mobility, and 1 Gbps for low mobility).

So far, LTE-Advanced foresees the use of up to eight transmit antennas at the base stations. In order to address huge increases in the average cell spectral efficiency, massive Multiple-Input Multiple-Output (MIMO) systems are currently being investigated as future extensions of LTE-Advanced for Release 12 and beyond [2]. These systems typically comprise several hundreds of low-power antennas, where the degrees of freedom in excess at transmission allow for a variety of signal processing possibilities in transmission and reception. These large MIMO systems are currently subject to intense research. Other wireless standards, such as IEEE 802.11, consider also the use of multiple antenna techniques for either spatially multiplexing several data streams or tailoring the radiated beams towards a given direction in space.

Some solutions are aimed at increasing spatial focusing of energy into specific directions, therefore addressing users more sharply [3]. So-called Time Reversal Beamforming (TRBF) focuses electromagnetic energy by means of probing the channel and time-reversing the received signals prior to transmission as described in patent U.S. Pat. No. 8,330,642-B2 "Imaging by Time Reversal Beamforming. Other more traditional beamforming solutions involve tailoring the radiated pattern, so that beams oriented towards different users present minimum overlapping in order to minimize inter-user interference.

In parallel with these research topics, inter-cell interference remains as a fundamental limitation in wireless systems. In massive MIMO systems, where the received signal to noise (SNR) values can be significantly enhanced with the massive use of beamforming, interference from neighbour cells can also be enhanced in the same factor by the beamforming process thus resulting in significant signal degradation. Furthermore, interference will likely present intermittent patterns according to the scheduler operation at the base stations, while employing modulation and coding schemes (MCS) which are in principle unknown to the victim user. Both drawbacks complicate the operation of Successive Interference Cancellation (SIC) receivers as stated by A. Ruegg et al. [6].

3GPP standards foresee several mechanisms for inter-cell coordination in order to manage interference. So-called enhanced Inter-Cell Interference Coordination (eICIC) deal with several solutions for inter-cell coordination, namely Almost Blank Subframes (ABS)-based eICIC and Carrier Aggregation (CA)-based eICIC [4]. Both solutions rely on coordinated resource sharing between the victim and the aggressor cell(s) in the time and frequency domains, respectively. ABS-based eICIC allows coordination of time resources in the form of a pattern of protected subframes, by which the aggressor cell relinquishes access to its users in order to alleviate the interference created towards the victim cell. CA-based eICIC coordinates frequency resources through use of Carrier Aggregation so that different spectrum is used for potentially interfered users. These solutions can be especially useful in heterogeneous network deployments.

However, in the context of massive MIMO systems the aforementioned solutions are not efficient as they are mainly intended for non-massive MIMO systems, where users are scheduled in time and frequency dimensions and no advantage is taken from the spatial dimension. Traditional sharing of time and frequency resources involves the whole set of beams in massive MIMO systems, while interference from an aggressor cell is usually caused by only one beam or a limited set of beams. More efficient inter-cell coordination schemes should aim at alleviating interference at user (or beam) level instead of cell level, thereby coordinating only the concrete resources which are in conflict between victim and aggressor cells, be it in time, frequency or space dimensions.

More specific solutions for inter-cell coordination are therefore needed for alleviating interference in massive MIMO deployments due to the use of advanced beamforming.

REFERENCES

[1] 3GPP TS 36.300, Evolved Universal Terrestrial Radio Access (E-UTRA) and Evolved Universal Terrestrial Radio Access Network (E-UTRAN); Overall Description, Stage 2 (Release 8)

[2] RP-121804, "New SID Proposal: Study on Full Dimension MIMO for LTE", 3GPP TSG RAN Meeting #58, Dec. 4-7, 2012

[3] F. Rusek et al (2013), "Scaling up MIMO: Opportunities and Challenges with Very Large Arrays", IEEE Signal Proc. Magazine, vol. 30 (1): 40-60

[4] A. Damnjanovic et al, "A Survey on 3GPP Heterogeneous Networks", IEEE Wireless Communications, June 2011

[5] S. Sesia, I. Toufik, M. Baker (editors), "LTE, the UMTS Long Term Evolution: From Theory to Practice" (2nd edition), John Wiley & Sons, 2011

[6] A. Rüegg, A. Tarable, "Iterative SIC receiver scheme for non-orthogonally superimposed signals on top of OFDMA", IEEE 21st International Symposium on Personal Indoor and Mobile Radio Communications (PIMRC), September 2010

SUMMARY OF THE INVENTION

According to a first aspect there is provided a method for beam coordination between base stations in wireless cellular systems, wherein, as commonly in the field, at least one user terminal connected to at least a first base station suffers interference from at least a second base station, said first and second base stations comprising advanced beamforming capabilities by means of including a large number of antennas, said beamforming capabilities conforming a radiation pattern towards connected users according to a discrete set of beamforming possibilities.

On contrary of the known proposals, the method of the first aspect comprises:

a) transmitting, by each of said base stations, a corresponding encoded value known as beam indicator through a physical beam indicator channel to all the users terminals connected thereto,
   wherein said physical beam indicator channel characterizes the actual beam in use by said base stations for transmission towards a given user,
   wherein said beam indicator is different for each of said connected users terminals by means of exploiting the beamforming capabilities in the cell;

b) creating, said at least one user terminal, a first interference report including at least the identity and the beam indicator of said second base station,
   wherein said identity is acquired by decoding a corresponding synchronization or broadcast channel; and
   wherein the beam indicator is obtained from decoding said physical beam indicator channel transmitted by said second base station;

c) further sending, said user terminal, said first interference report to said first base station;

d) creating, by at least said first base station, with said received first interference report a second interference report including at least information of said user terminal, of said second base station and of said obtained beam indicator, said second interference report being dynamically updated, for instance adding or removing entries in the second interference report, according to the receiving of said first interference report; and e) coordinating time and/or frequency resources, said first base station, between their own beam and the beam of said second base station identified in said second interference report, so that only beams causing interference are involved in the beam coordination process.

The first interference report of said step b) preferably is created by all the user terminals connected to the first base station, said first interference report including information regarding the identity and the beam indicator of each interfering base station.

In an embodiment, the second base station may also create said second interference report based on the first interference report received from its connected user's terminals.

The second interference report as a preferred option is created in the form of a table including entries with the identified interference relationships, said entries containing for an interfered user and an interfering base station the related beam indicator. The beam indicator preferably will include at least a number or a set of coordinates in a coordinate system, and generally will be protected with a channel encoder for improved detection and scrambled with a sequence dependent on the cell identity for cell differentiation.

The first interference report may be sent either periodically every certain period of time or upon request of said first base station and generally will comprise a Layer-3 control message.

According to a second aspect there is provided a system for beam coordination between base stations in wireless cellular systems, comprising as commonly in the field: at least one user terminal; at least a first base station; and at least second base station, wherein said at least one user terminal is connected to said first base station and suffers interference from said second base station, said first and second base stations being equipped with a large number of antennas so that having advanced beamforming capabilities.

On contrary of the known proposal in the system of the second aspect:

said base stations comprise first means configured for transmitting a corresponding encoded value known as beam indicator through a physical beam indicator channel to all the users terminals connected thereto,
   said physical beam indicator channel characterizing the actual beam in use by said base stations for transmission towards a given user,
   said beam indicator being different for each of said connected users terminals by means of exploiting the beamforming capabilities in the cell;

said at least one user terminal comprises:
   first means configured for creating a first interference report including at least the identity and the beam indicator of said second base station; and
   second means configured for sending said first interference report to said first base station; and said first base station further comprises:
   second means configured for creating with said received first interference report a second interference report that includes at least information of said user terminal and of said second base station and its beam indicator, said second interference report being dynamically updated according to the receiving of said first interference report; and
   third means configured for coordinating time and/or frequency resources between their own beam and the beam of said second base station identified in said second interference report, so that only beams causing interference are involved in the beam coordination process.

In an embodiment, the second base station further comprises second means configured for creating said second interference report based on the first interference report received from its connected user's terminals.

The subject matter described herein can be implemented in software in combination with hardware and/or firmware, or a suitable combination of them. For example, the subject matter described herein can be implemented in software executed by a processor.

According to another aspect there is provided a computer program product, comprising a computer readable medium comprising code for causing at least one computer to receive a first interference report from at least one user terminal, said first interference report including the identity and a beam indicator of the base station causing interference to said user terminal; create and update, with said received first interference report, a second interference report including at least information of said user terminal, of said base station causing interference and of said beam indicator; and coordinate, time and/or frequency resources with said base station causing interference by considering the beam identified in said second interference report.

BRIEF DESCRIPTION OF THE DRAWINGS

The previous and other advantages and features will be more fully understood from the following detailed description of embodiments, with reference to the attached, which must be considered in an illustrative and non-limiting manner, in which:

FIG. 5 is an example of a second interference report or Automatic Interference Relation Table generated at the serving base station for management of interference relationships.

DETAILED DESCRIPTION OF THE INVENTION

Figure 1:
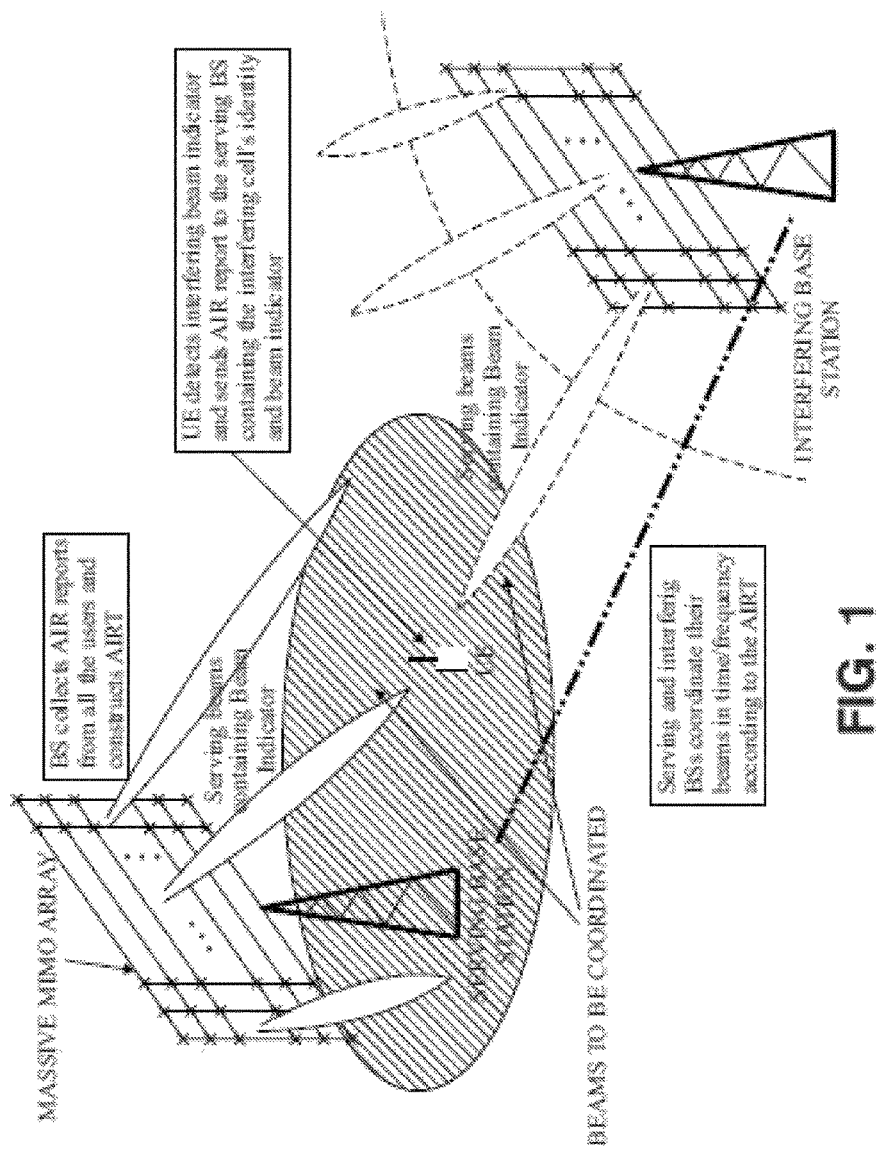
FIG. 1 illustrates the proposed invention for alleviation of inter-cell interference in a massive MIMO scenario.

In reference to FIG. 1 it is illustrated the basic idea for the proposed invention, where an user or user terminal (UE) is connected to a first or serving base station BSA having a large number of antennas in a massive MIMO deployment, while at the same time experiencing significant interference from at least a second base station BSB or neighbour base station also having a large number of antennas.

It is assumed that both serving BSA and interfering BSB base stations have means to label the actual beam being radiated towards an intended user, in the form of a suitable numbering or coordinate in any suitable coordinate system. This beam numbering may be based upon a discrete set of possibilities according to the specifics of the beamforming procedure. It will also be assumed that both serving BSA and interfering base stations BSB are connected through a direct interface between them, such as X2 interface in LTE systems, or any other similar means aimed at facilitating the exchange of control information.

So-called massive MIMO cell sites in a wireless cellular system comprise a base station equipped with a large number of transmit antennas. The increased number of antennas at the base station allows for a variety of advanced beamforming techniques beyond the capabilities of traditional MIMO systems. Advanced beamforming enables enhanced multi-user MIMO by generating a set of narrow beams, with minimal or even ideally null interference from other beams in the system. Overall cell capacity is therefore boosted by simultaneously addressing a large number of users in the same time and frequency resources.

However there are two main drawbacks for such massive MIMO systems regarding interference:

Massive MIMO systems require a large number of pilots for the users to estimate the channel characteristics as seen at the receiver. Given the large number of transmit antennas, a correspondingly large number of pilot signals has to be inserted within normal transmissions for channel estimation. Pilots from different cells will in general not be orthogonal as some re-use of the time-frequency resources is needed. So-called pilot contamination between cells can therefore limit the performance of the overall system [3].

While advanced beamforming can boost the signal to noise ratio (SNR) of the serving signal at reception, it can also increase the interference level from a neighbour cell pointing towards another user under the same line of sight as the user to be served. Interference must therefore be addressed appropriately.

Both phenomena demand some coordination between cells that extend beyond current interference mitigation solutions devised for non-massive MIMO systems, namely ABS-based eICIC and CA-based eICIC for the case of LTE-Advanced.

Figure 2:
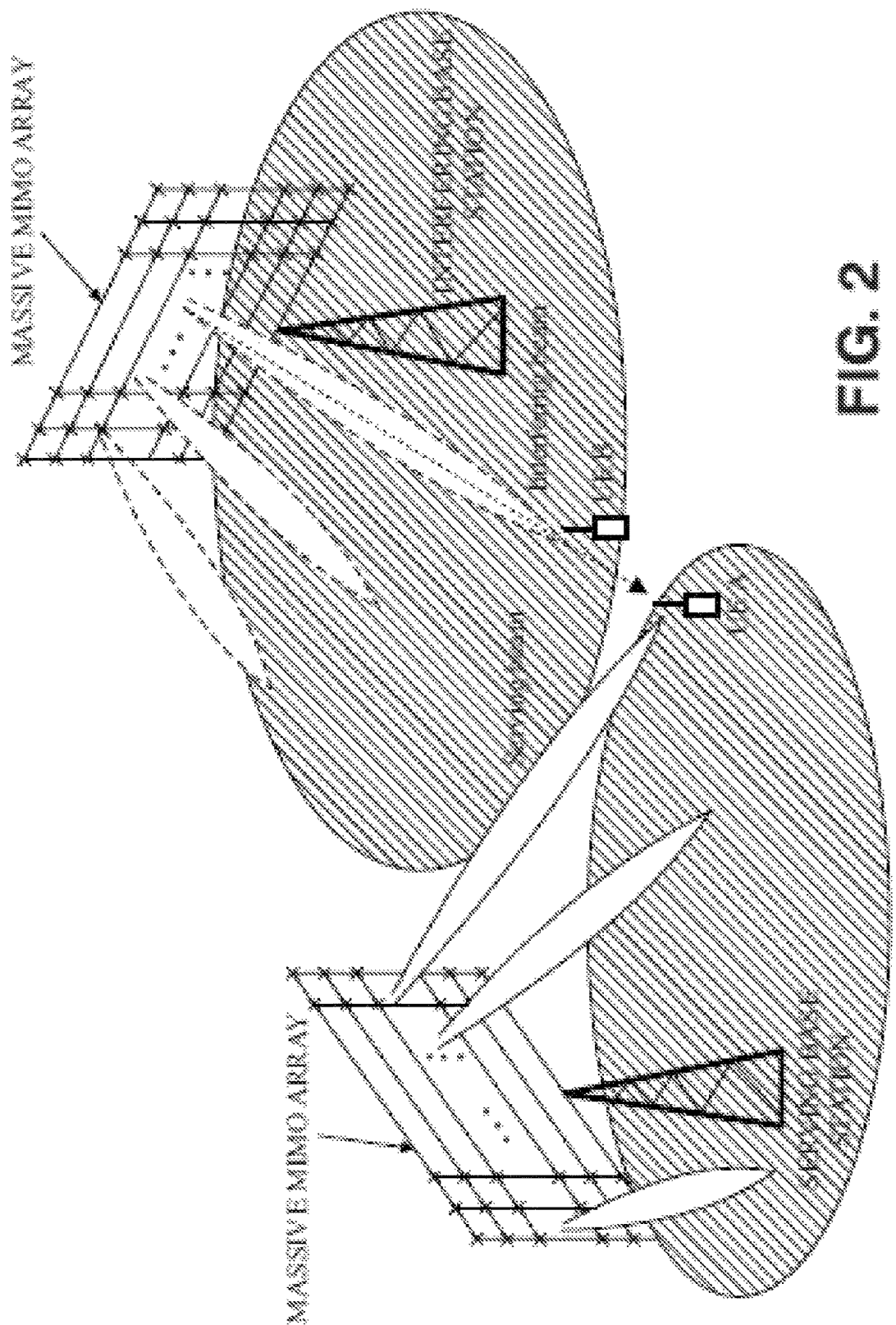
FIG. 2 illustrates a scenario with one user connected to a massive MIMO base station through a serving beam while suffering interference from an interfering cell's beam.

FIG. 2 shows a possible scenario for the proposed invention. A user, UE A in the figure (located at the cell edge) receives a significant signal level through a given serving beam, but simultaneously user UE B from a neighbour cell is also receiving a boosted signal level from a different beam (denoted as "interfering beam" in the figure). As both UE A and UE B are aligned with respect to the latter beam, it acts as a source of interference for UE A and reception is degraded.

To alleviate interference, the present invention proposes a dynamic procedure for coordinating beams among neighbour cells, based on the introduction of a new physical control channel for beam detection as well as a procedure for coordinating resources that involves only the affected beams. Other users not involved in the interference situation will not have to share resources with the other cells, contrary to ABS-based eICIC or CA-based eICIC in LTE-Advanced where macro users are only allowed to use a fraction of resources even if they are located near the serving base station BSA.

The main characteristics proposed by the present invention for inter-cell beam coordination are:

Introduction of a new physical control channel, denoted as Physical Beam Indicator Channel or PBICH, carrying an indication of the actual beam employed towards the user. This indication can consist on a number, a pair of numbers or a coordinate in any suitable coordinates system, provided that it can unambiguously identify the actual beam in use for each user. Contrary to prior art control channels, this channel will also benefit from the same beamforming procedures employed for data channels in such a way that each user will only see the indicator corresponding to its actual beam (and not to the others).

Any physical structure for such control channel will be considered valid for the purpose of the present invention, provided that it contains an unambiguous indicator for the beam in use towards each user. This invention will consider any actual channel with these characteristics as a suitable PBICH channel.

Figure 3:
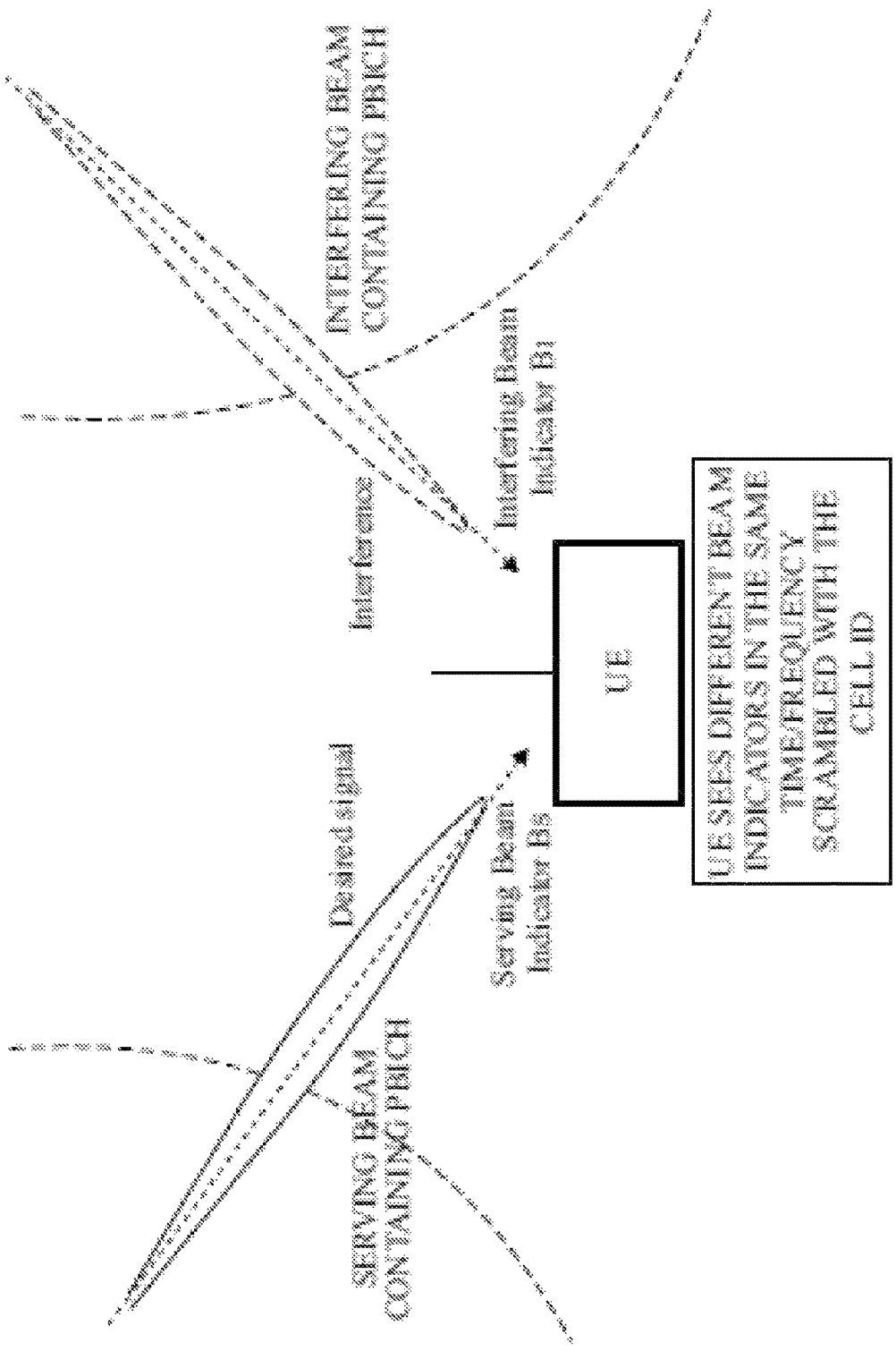
FIG. 3 illustrates the case when an interfered UE detects both serving and interfering beam indicators with the aid of the proposed physical beam indicator channel or PBICH, according to an embodiment.

The PBICH channel will have the property of being easily decodable by the users (both from the serving cell and from adjacent cells). For this purpose, it can be spread across time and/or frequency resources for enhanced diversity, and scrambled with a seed dependent on the physical cell identity for cell differentiation. FIG. 3 schematically depicts the rationale for the proposed PBICH channel. With the aid of a scrambling operation dependent on the cell identity the user can distinguish the beam indicators coming from different cells.

Figure 4:
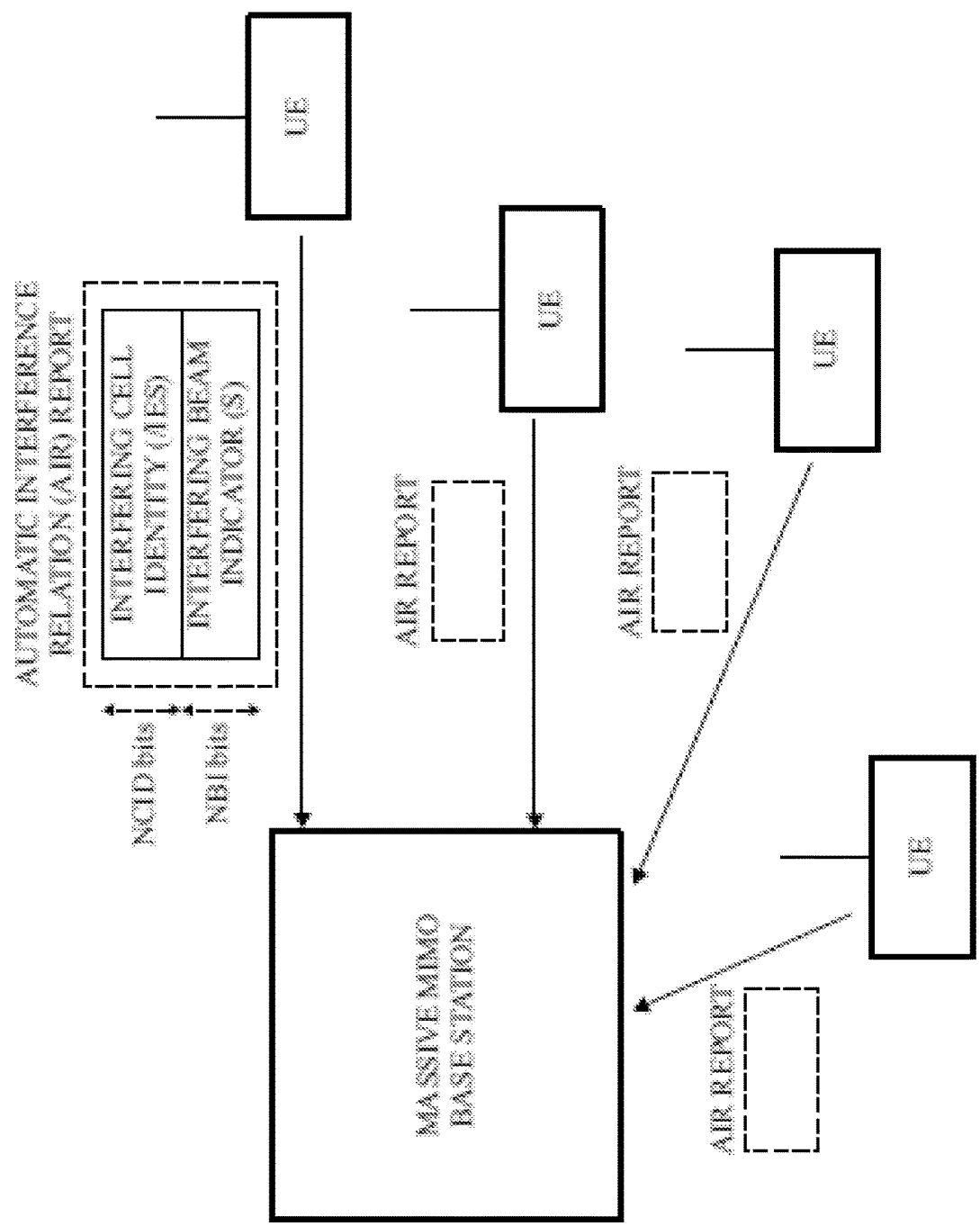
FIG. 4 is an example how users send first interference reports or Automatic Interference Relation reports to the serving base station containing interfering cell's identity and beam indicator according to an embodiment.

Users connected to a given serving base station BSA and suffering interference from a neighbour base station BSB can decode the PBICH corresponding to the interfering cell, given that its cell identity is previously detected through any synchronization or broadcast channel. The user sends a first interference report, for instance a Layer-3 control message, to the serving base station BSA containing the interfering base station's identity as well as the interfering base station's beam indicator (or a suitable list if more than one interfering cell is detected). This control message can be a stand-alone message or a part of an existing control message (e.g. part of the measurement reports), and will be hereinafter denoted as Automatic Interference Relation (or AIR) report. FIG. 4 schematically illustrates the rationale for the proposed AIR reports. Users connected to the serving base station BSA will send AIR reports containing detailed interference relationships with specific neighbour cells' beams. Interference detection may be based upon a given signal threshold, signal to interference and noise ratio (SINR), or any other suitable metric at the receiver.

The serving base station BSA will collect the AIR reports from all users and will populate a second interference report preferably in the form of a table (denoted as Automatic Interference Relation Table, or AIRT) containing multiple entries with identified interference relationships. Each entry corresponding to the interfered user I and the interfering cell J would contain the interfering beam indicator $BI_{I,J}$, as illustrated in FIG. 5. Rows correspond to cell users (each being served by a different beam) and columns correspond to interfering cells. If there is more than one interfering beam indicator in the same row this means that such user is suffering interference from several cells. Each user is associated with a given serving beam according to the partitioning of resources at the serving base station BSA.

Figure 6:
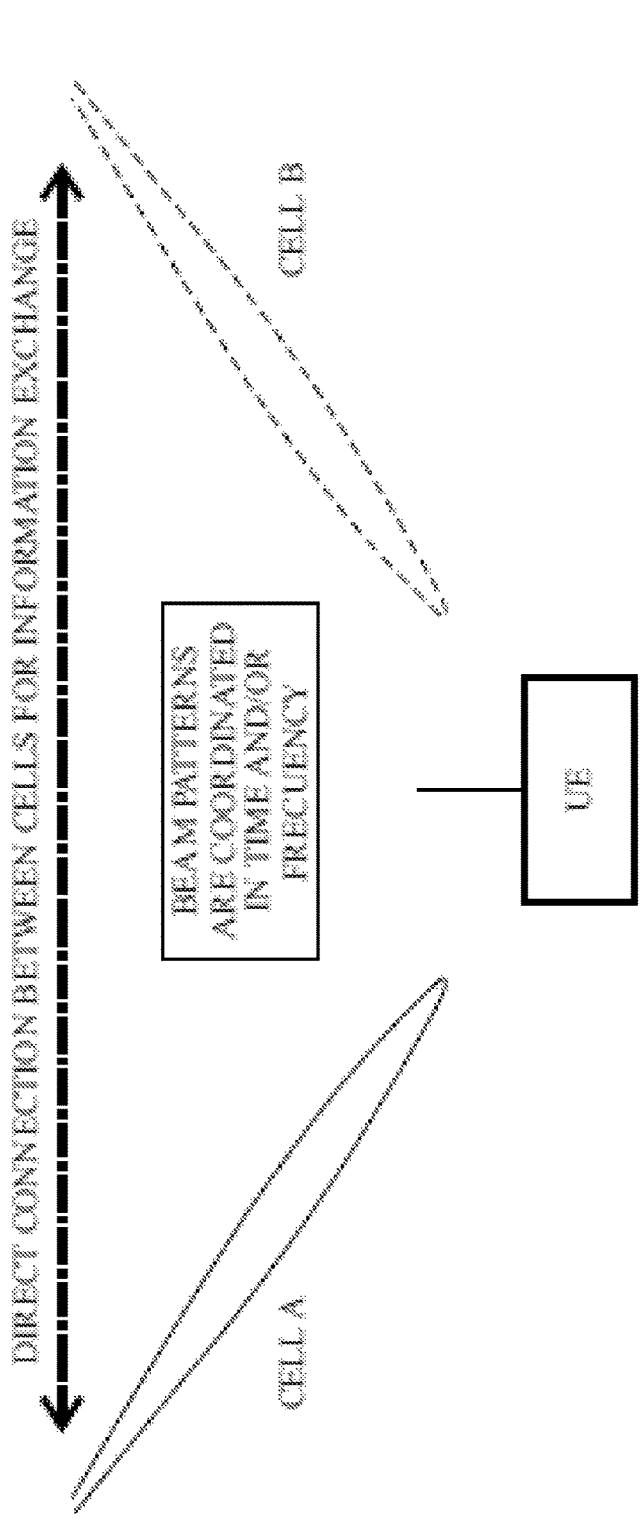
FIG. 6 is an example of a pattern of time coordination between two cells for interference avoidance involving two beams.

After populating the AIRT the base station BSA has a clear picture of which neighbour cells are actually posing interference towards a given user through a specific beam. Then, with the aid of some direct connection with the involved cells, the base station BSA can coordinate time/frequency resources between its serving beams and the interfering beams identified in the table. Coordination may be based on time and/or frequency, in the sense that different time instants and/or frequency resources can be used by both cells with respect to the specific beams in use. Such coordination would not impact the rest of the beams and users (including legacy users), which poses an advantage over traditional eICIC solutions in LTE whose techniques affect all the users in a cell. This is illustrated in FIG. 6, where an example of time coordination is depicted in the form of an "on/off" pattern agreed by the serving and interfering cells' beams. Other similar patterns involving frequency resources are also equally valid.

The proposed Automatic Interference Relation Table is fundamentally different to so-called Automatic Neighbour Relation Table (ANRT) function in LTE. ANRT strives to collect neighbour relations in an automatic way through terminals reporting, and as such these neighbour relations are semi-static (they will be valid unless a base station is switched off or has its transmission power changed) and refer to the transmission in the whole cell. Instead, interference relationships in this proposal deal with the more general term of instantaneous interference produced by a particular interfering beam over the user, due to the beamforming capabilities of massive MIMO base stations. While ANRT can detect a single neighbour relationship over a long time, the proposed AIRT will detect zero, one or multiple interference relationships for the same neighbour cell according to the neighbour cell's beams in use. As this interference depends in general on the location of the victim user, the aggressor base station and their beamforming capabilities, AIRT will be much more dynamic and will have a much higher resolution than ANRT.

For the beamforming techniques to be effective, users in massive MIMO systems will be in nearly static conditions as the base station will try to track the users' location in the cell. Any interference from an adjacent cell will therefore be perceived over a significant period in time. This leaves sufficient time for AIR detection and reporting from any victim user.

Figure 7:
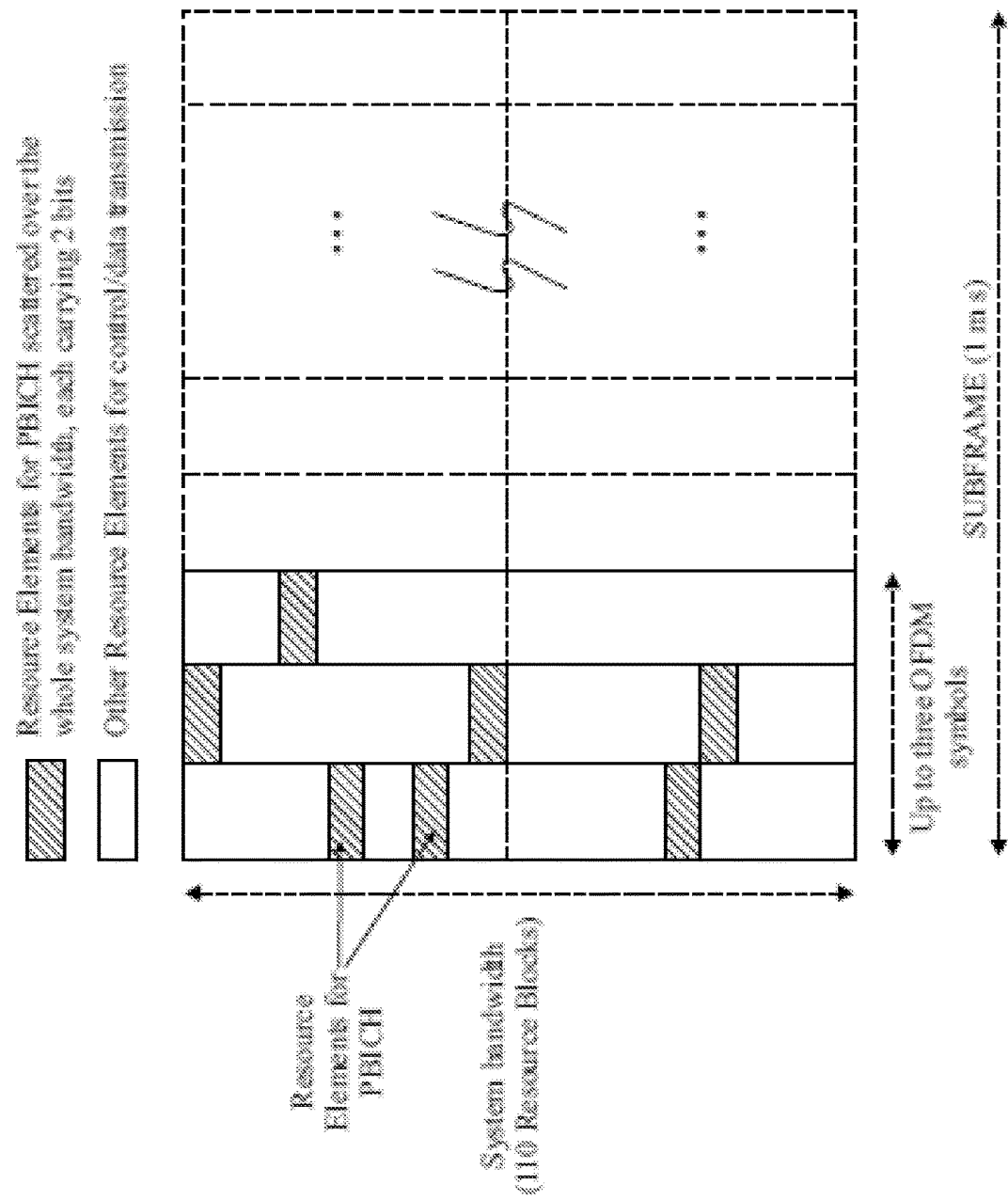
FIG. 7 is an illustration of a possible structure for the PBICH channel in LTE.

In reference to FIG. 7 it is illustrated a possible structure for the proposed PBICH channel, for the case of an LTE-like Orthogonal Frequency Division Multiplexing (OFDM) wireless system. Any underlying multiplexing technique other than OFDM would require different structure for the PBICH, but the fundamental ideas behind its design would remain.

As seen in FIG. 7, and following LTE terminology, the physical structure of the PBICH generally comprises a number of Resource Elements (REs) scattered across the whole system bandwidth, and up to three OFDM symbols in the time domain. Each RE contains a complex QPSK symbol according to the coding and scrambling processes which may be defined for PBICH prior to transmission. The number of OFDM symbols over which the PBICH extends would depend on the number of OFDM symbols reserved for the Physical Downlink Control Channel (PDCCH), with which this channel would be multiplexed, according to the traffic load in the cell. REs reserved for PBICH would not be used for transmission of any other control channel, including Physical Control Format Indicator Channel (PCFICH) and Physical HARQ Indicator Channel (PHICH). Therefore the mapping of these channels should be changed accordingly, and also due to the reasons explained below.

An important point in massive MIMO systems comes from the fact that significant re-use of time and frequency resources is possible for the control channels, hence avoiding complex multiplexing of control messages. As an example, PDCCH in LTE conveys multiple control messages each addressing a different user in a given subframe, multiplexed over time and frequency, thus resulting in complex search spaces for detection as disclosed by Sesia et al. [5]. This can compromise cell capacity especially in low system bandwidths, where scarcity of resources available for PDCCH can limit the number of users to be addressed in a subframe even if there is still enough data capacity. On the contrary, the advanced beamforming enabled by massive MIMO allows for spatially separating dedicated control channels intended for different users. This extends the capacity of the control channels by a factor equal to the number of users simultaneously addressed, in contrast to traditional systems where control channel capacity is a result of the overall system design. Therefore, control channels can be made more reliable by occupying a larger fraction of the time/frequency resources. The PBICH can thus extend over a number of resource elements much larger than otherwise available in traditional LTE systems, given that both PDCCH and PHICH can present different contents to different users while being scattered throughout the whole system bandwidth.

The PBICH would comprise a beam indicator given by a number (or integer number) or a set of coordinates in a coordinate system (or a pair of integer numbers in any suitable format). The beam indicator may refer to one of a discrete set of possibilities according to the capabilities of the antenna arrays, or any other suitable indication. In order to enhance detection the contents of this channel can be encoded with a robust channel code (such as Repetition Code, Reed-Muller or other similar codes) and spread over the system bandwidth for increased diversity. It will also be scrambled with a complex sequence dependent on the cell identity for cell differentiation. This scrambling operation may be based on complex multiplication by a Gold code[5] or any other similar operation allowing for cell differentiation at the receiver.

Figure 8:
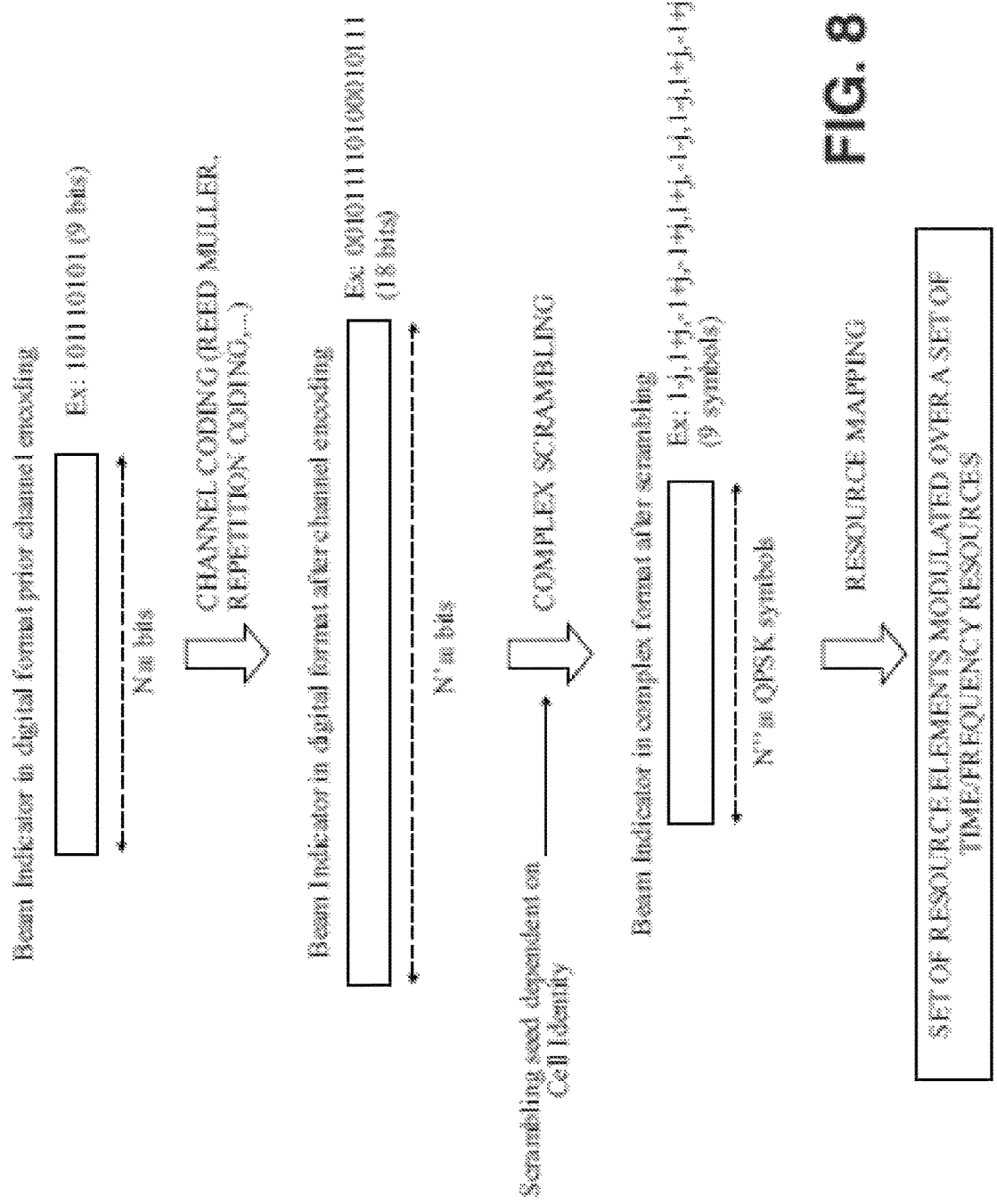
FIG. 8 is an example of a possible encoding operation for the PBICH channel.

FIG. 8 illustrates an example of possible encoding and scrambling operations for PBICH. The beam indicator prior to channel encoding has $N_{BI}$ bits and passes through a channel encoder that transforms it into a code word of length $N'_{BI}$ bits ($>N_{BI}$). After that, complex scrambling with a sequence dependent on the cell identity transforms it into $N''_{BI}$ QPSK complex symbols. Finally, appropriate mapping on resource elements results in specific REs containing the encoded PBICH symbols and spread over the system bandwidth along a number of OFDM symbols.

An example of a channel encoding rate 1/2 is shown in the figure (with arbitrary bits), as well as a scrambling operation with arbitrary QPSK symbols, considering a beam indicator length of 9 bits thus covering up to 512 different beams.

The possible structure for the PBICH channel described above represents only a suitable example for an LTE-like system, but the fundamental ideas can be equally applied to other wireless systems by changing the implementation details to the specifics of the actual radio frame structure.

Figure 9:
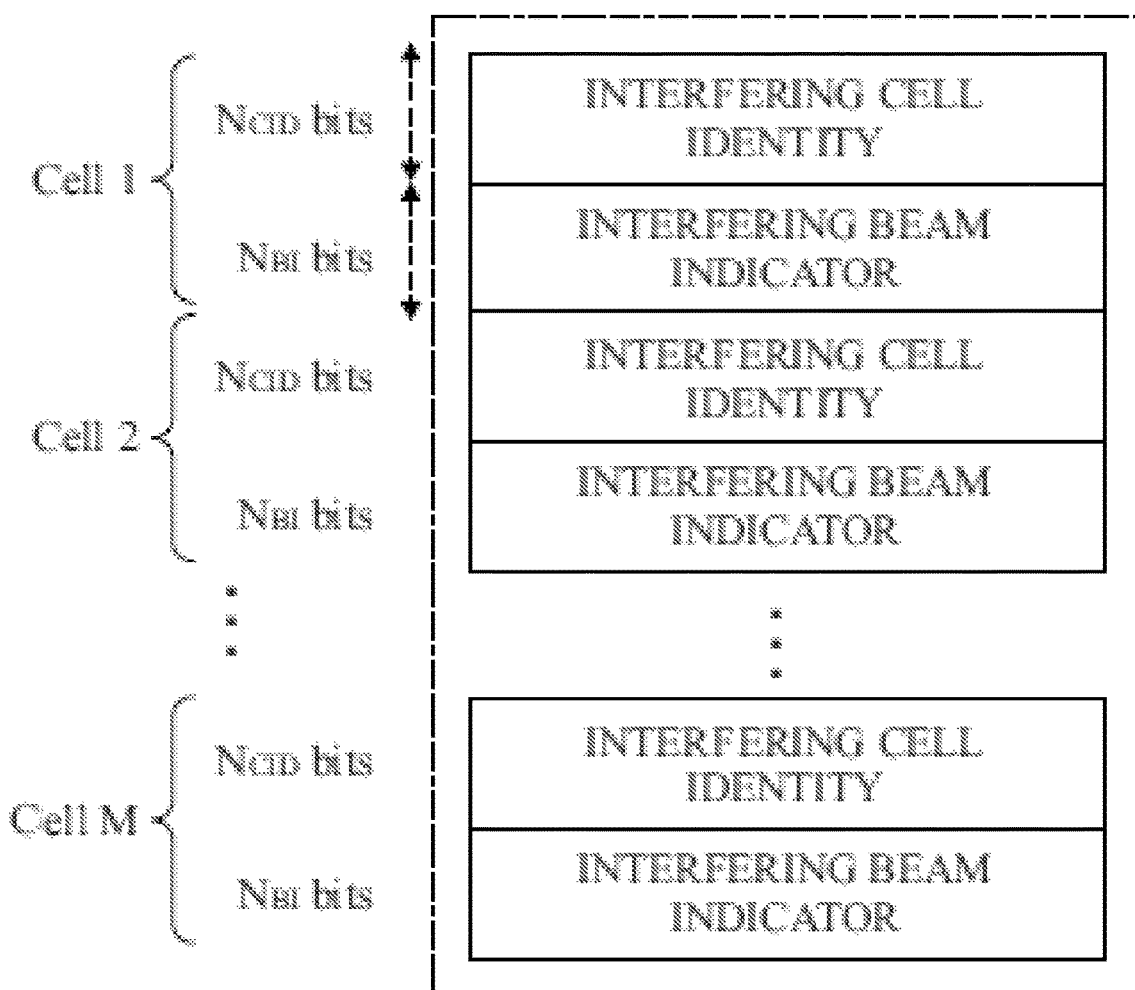
FIG. 9 illustrates a possible structure of the first interference report or Automatic Interference Relation (AIR) report.

FIG. 9 shows schematically the proposed structure for the Automatic Interference Relation reports. The proposed scheme does not preclude any other similar structures provided that they convey the information required by the present invention.

As shown in FIG. 9, the minimum set of contents for the AIR report for each of the interfering cells as seen by the terminals will be:

The interfering cell's identity, as acquired by the user through decoding of the corresponding synchronization or broadcast channel, such as the PBCH or the Primary/Secondary Synchronization Signals (PSS/SSS) in LTE. Such information can be easily acquired by briefly synchronizing to the interfering cell and detecting the Physical Cell Identity (PCI).

The beam indicator of the interfering cell, as contained in the corresponding PBICH channel. Decoding of the information requires that the user, once synchronized to the interfering cell's signal, detects the appropriate pilot or reference signals for channel estimation and equalizes the received signal prior to PBICH decoding.

Figure 10:
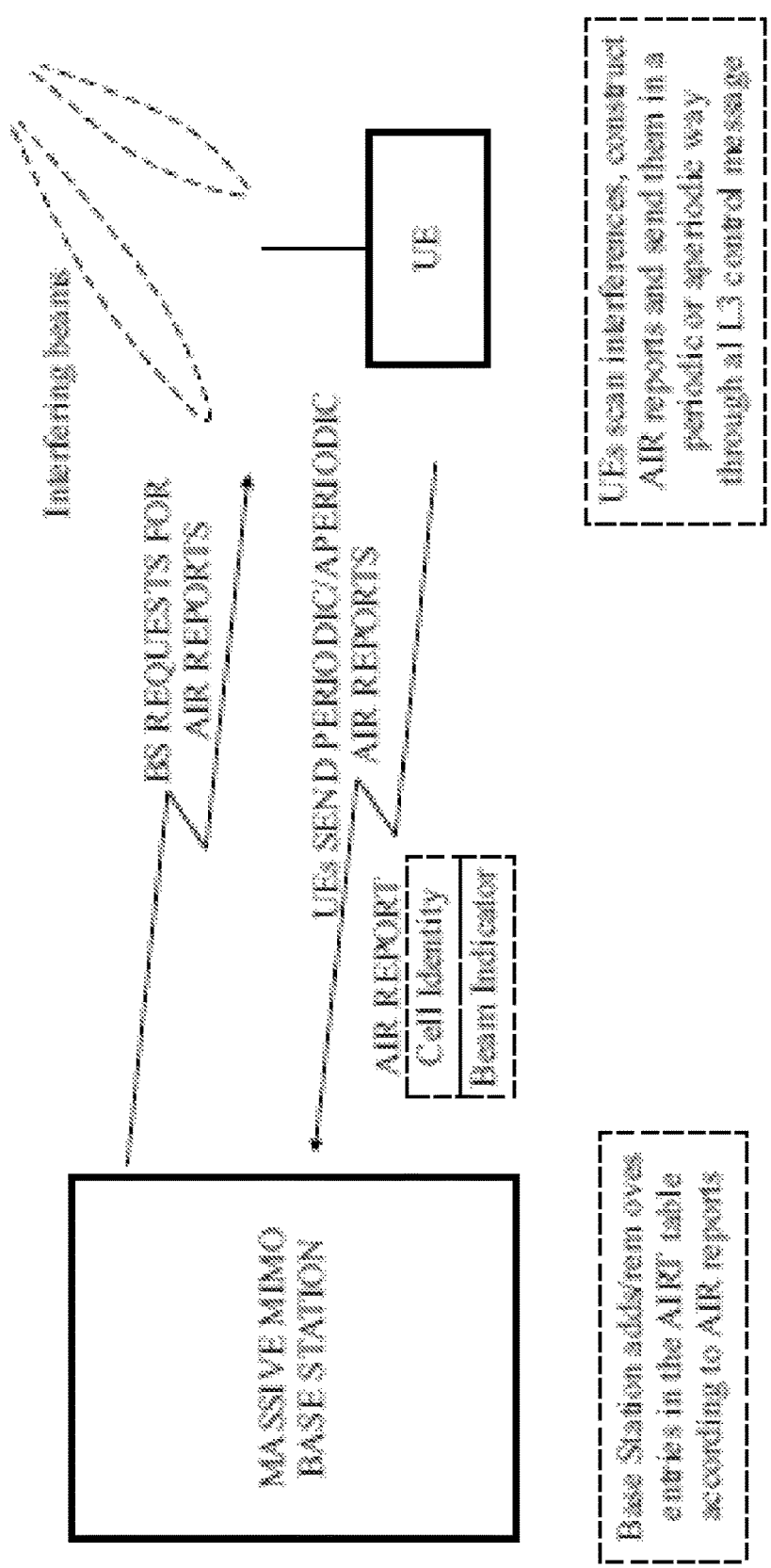
FIG. 10 is an illustration of a periodic/aperiodic reporting of first interference reports or Automatic Interference Relation reports upon request from the base station.

The AIR report can be periodically sent by the terminals, or sent in an aperiodic way upon request from the base station (in the form of a stand-alone message or as part of an existing control message). Users in massive MIMO systems are not supposed to be in fast-moving conditions, and interference from a neighbour cell's beam should be persistent enough so that the victim user has enough time to acquire the interfering cell's identity and decode the PBICH channel. This is exemplified in FIG. 10, where the base station can request for periodic or aperiodic AIR reports and according to these reports it shall add or remove interference relationships in the AIRT. If a given user does not detect significant interference from other cells, this will be specifically signalled in the report (by a reserved identifier or other suitable means). Increased interference will usually trigger neighbour cells measurements as part of the normal procedures for cell reselection and handover [5]. In LTE these measurements involve acquiring neighbour cell identities and, if ANR is supported, also decoding the PBCH to acquire the E-UTRAN Cell Global Identifier (ECGI). The proposed scheme relies on the same procedures to acquire cell identity and (additionally) the interfering cell's beam indicator through PBICH decoding. Systems other than LTE foresee similar procedures for neighbour cell measurements as the ones involved for AIR reporting in the present invention.

As explained before, with the aid of AIR reports collected from all the users in a cell the base station BSA populates the table or AIRT, whose entries correspond to interfering relationships between a given user and a specific beam in an interfering cell BSB. According to FIG. 5, the contents for the AIRT entries preferably will be the following:

Victim user (represented by a suitable row in the table): contains a suitable user identifier, such as LTE's Cell Radio Network Temporary Identifier (C-RNTI) or the beam indicator in use for that user, but not precluding others.

Interfering or aggressor cell (represented by a suitable column in the table): contains the physical cell identity of the cell creating interference towards the victim user.

Interfering or aggressor beam indicator (represented by a non-null content in a given element of the table): contains the beam indicator as read by the user when detecting significant interference from the aggressor cell.

These interference relationships are not bidirectional, in the sense that if a neighbour cell causes interference to a given user in the cell, such cell will not necessarily cause interference to users in the former cell. This is an advantage of selective beamforming compared to traditional schemes where interference relationships are reciprocal, i.e. if cell A interferes cell B at some points, cell B will in general interfere cell A at some other points. This is illustrated in FIG. 11, where devices in traditional systems (top of the figure) always suffer from neighbour cell's interference at the cell edges, while massive MIMO systems (at the bottom) require that the user, a neighbour cell user and the neighbour cell's beam are all aligned.

Figure 11:
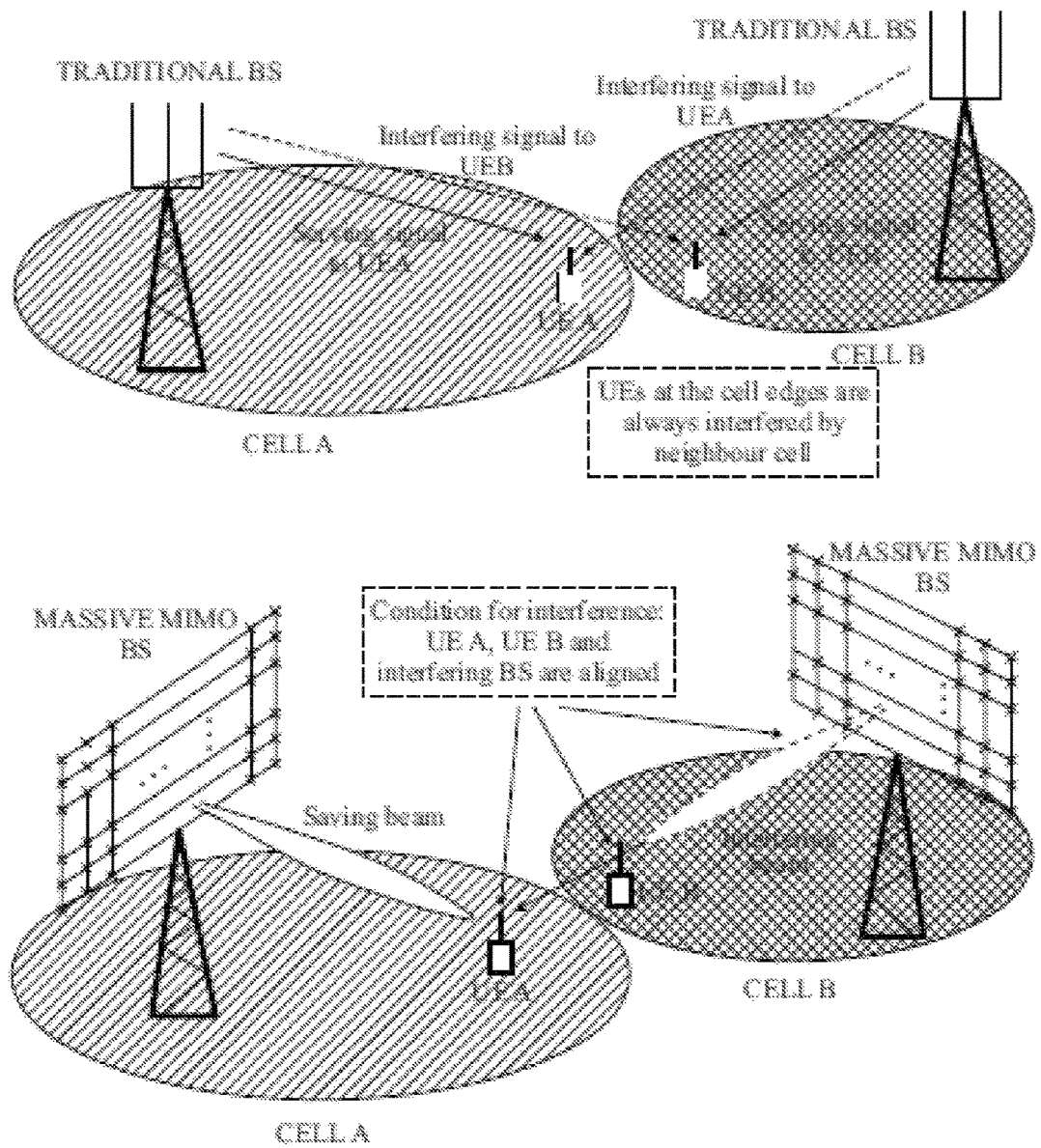
FIG. 11 is an illustration of the difference between traditional systems (where interference relations are reciprocal) and massive MIMO systems (where the users need to be aligned with the interfering beam).

As seen in FIG. 11, massive MIMO systems benefit from increased isolation due to beamforming, but if UE A, UE B and the interfering beam are all aligned interference will likely appear. This can be partially mitigated with proper beamforming in the vertical plane, but in general some sort of inter-cell coordination is required as proposed in the present invention.

With the aid of AIRT the base station BSA can perform specific interference mitigation strategies towards the aggressor cells' beams identified in the AIRT. If the serving cell has a direct interface with a given aggressor cell, it will be easy to exchange information between both cells in order to coordinate time and/or frequency resources corresponding to the affected beams.

Figure 12:
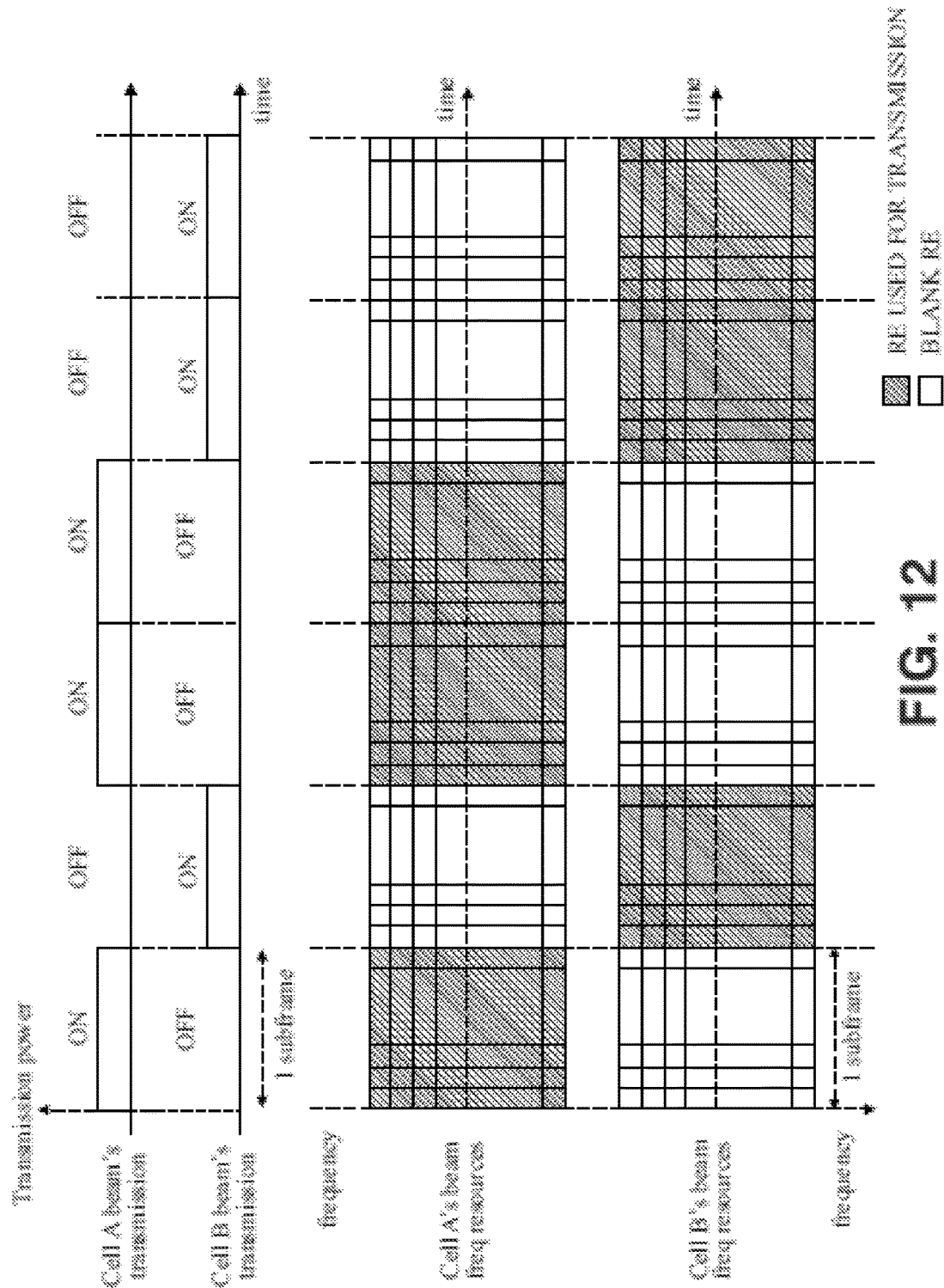
FIG. 12 is an example of a possible inter-cell beam coordination scheme based on time partitioning.

FIG. 12 illustrates one possible inter-cell beam coordination scheme. The beams corresponding to cells A and B are interleaved in the time domain in such a way that when cell A's beam is active, cell B is not transmitting and vice versa. This requires that both cells are phase-synchronized. The figure also shows the frequency contents for the two beams, illustrating that all Resource Elements can be blanked at the protected subframes therefore avoiding interference towards the victim user.

This possibility differs from so-called Almost Blank Subframes in LTE-Advanced in that only the beams involved in the corresponding AIRT entry will be coordinated, as opposed to ABS where the whole subframe is switched on or off (except for the legacy control channels). Both cells will notify each other the pattern of used blanked beams. It is to note that, contrary to ABS where some control channels in the subframe need to be transmitted (for the support of legacy terminals), the beams in this invention may be completely switched off as they are intended for a specific user and not for legacy terminals.

Figure 13:
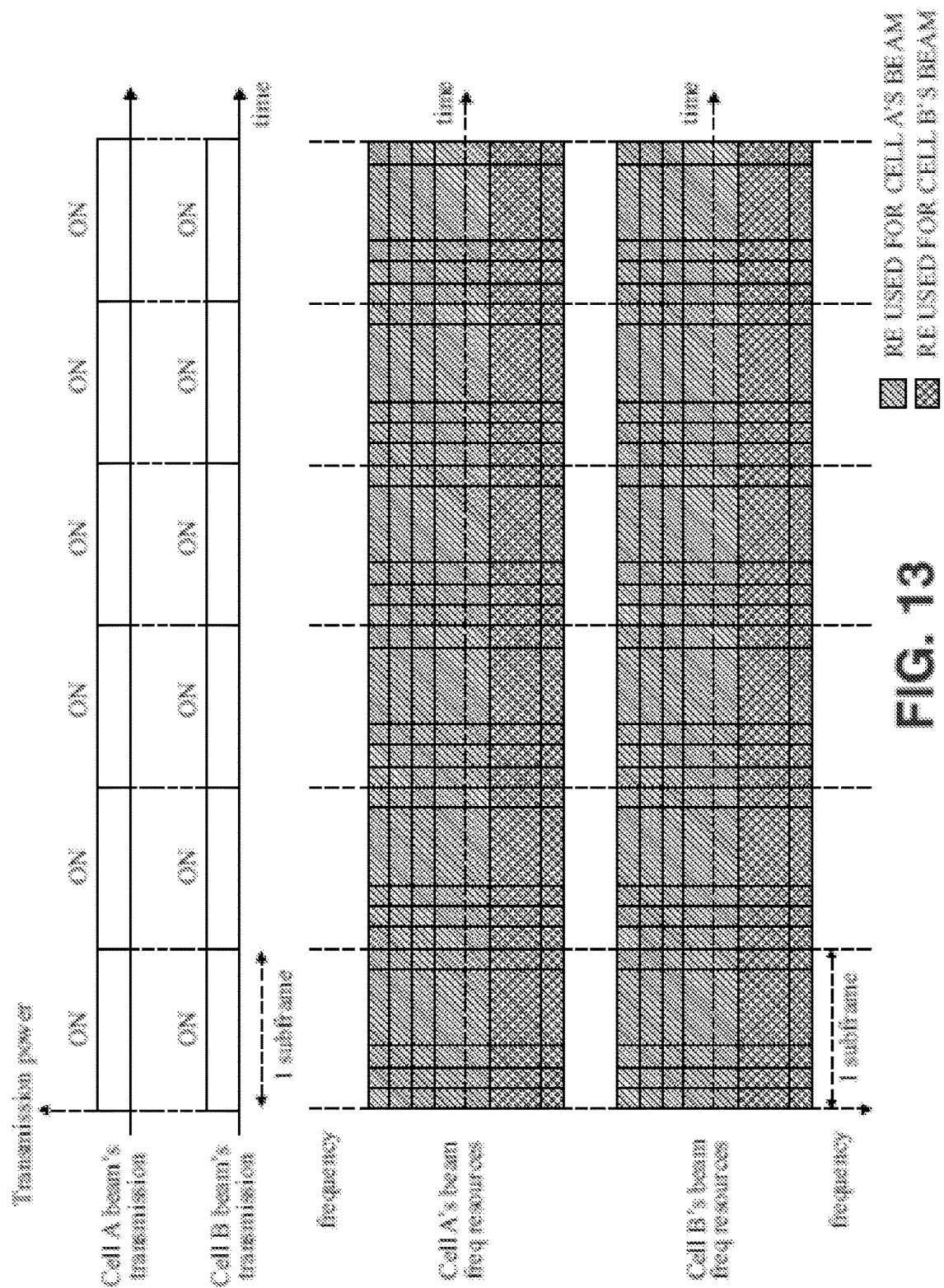
FIG. 13 is an example of a possible inter-cell beam coordination scheme based on frequency partitioning.

Another possible coordination scheme, as shown in FIG. 13, comprises the assignment of non-overlapping parts of the spectrum to both users in the affected beams. As in the previous case, other users would not be affected by this coordination scheme which represents an advantage over traditional ICIC and eICIC schemes. Transmission power is not switched on and off in this case, but the frequency regions do not overlap for the involved beams. This solution does not require that the base stations are phase-synchronized.

A suitable mixture of both strategies may also be devised.

After coordination, the corresponding control channels will inform the users about the resources to be used according to the coordination scheme, thus enabling the terminals to monitor the appropriate time/frequency resources under its corresponding beam.

Other similar coordination strategies can also be devised according to implementation needs, without departure from the ideas described in this invention.

Figure 14:
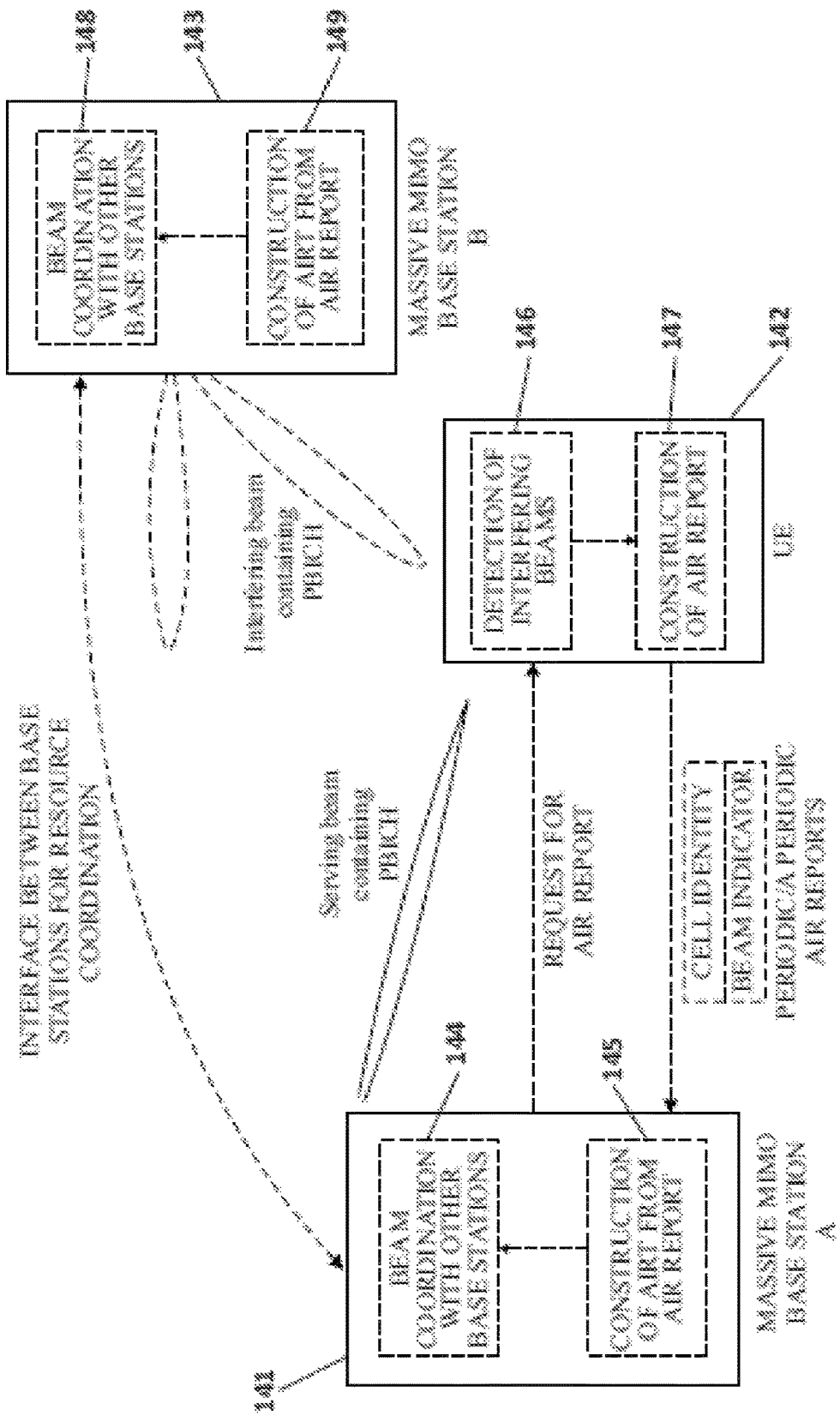
FIG. 14 illustrates the scenario and process for performing beam coordination between base stations in wireless cellular systems according to several embodiments of the present invention.

In reference to FIG. 14 it is illustrated a particular embodiment of the present invention. Block 141 represents Base Station A, which for the purpose of the proposed embodiment acts as a serving cell for the user equipment (block 142). Both Base Stations (serving BSA and interfering BSB) have massive MIMO capabilities therefore achieving advanced individual beamforming towards connected users. Simultaneously, Base Station B (block 143) represents a significant interference to the UE. Both serving and interfering beams carry suitable beam indicators through the PBICH channel, by which the UE can detect the interfering beam indicators in block 146. BSA can request the UEs to send suitable Automatic Interference Relation (AIR) reports in a periodic or aperiodic way, and block 147 in the UE constructs such reports and sends them to the serving base station BSA. AIR reports will include the list of interfering cell identities as well as beam indicators. BSA receives the AIR reports from all connected users and constructs an Automatic Interference Relation Table (AIRT) through block 145, by which it will identify suitable cells for resources coordination. By means of a direct interface with BSB, BSA will coordinate time and/or frequency resources through block 144 regarding the beams identified in the AIRT. BSB will coordinate resources with BSA (as well as with other base stations) through block 148, and will also construct its own AIRT through block 149 according to the AIR reports received from its own connected users. Coordination is thus possible with multiple cells according to the contents of the AIRT table.

The present invention exploits the possibilities of advanced beamforming in wireless massive MIMO systems by allowing coordination of beams between neighbour cells. A new physical channel is introduced with the purpose of containing a suitable beam indicator, with the property of carrying different beam information for each user by means of the spatial separation provided by beamforming. With this new channel, a procedure for collecting interference relationships by the terminals and reporting them to the base station is proposed, thus extending traditional neighbour relationships (such as ANR in LTE) to more dynamic interference relationships dealing individually with interfering beams. With this information the victim and aggressor cells can coordinate resources on a per-beam basis, by adjusting both time and/or frequency resources in order to avoid collisions between the serving and interfering beams.

One of the drawbacks of massive MIMO systems is the resulting pilot and/or signal contamination which may arise if the beams from adjacent cells are not coordinated, thus giving rise to significant interference enhanced by the beamforming process. Introduction of AIR reports brings dynamic information of inter-cell interference from specific beams, which can be alleviated by suitable coordination schemes between the affected cells and beams. Alleviation of inter-cell interference, in addition to beamforming gains, may boost the capacity of massive MIMO systems in the same order of magnitude as the ratio between the number of antennas in massive MIMO with respect to traditional MIMO systems.

The proposed channel containing the beam indicator can benefit from the beamforming process, whereby ideally no interference is present from other beams. In contrast to traditional systems, where dedicated control data corresponding to multiple users are multiplexed in time and/or frequency, the proposed physical beam indicator channel can enjoy higher diversity gain by spreading over the whole resources without incurring into interference. This facilitates detection of the aggressor's beam without the need to support complicated search spaces as in LTE-Advanced.

Set up and release of AIR entries in an appropriate table allows for dynamically coordinating resources between cells in a more effective way than traditional inter-cell coordination solutions can do. This can materialize the theoretical average capacity gains per unit cell foreseen for massive MIMO as compared to traditional MIMO systems, claimed to be of several orders of magnitude if no interference issues appear.

The scope of the present invention is defined in the following set of claims.

The invention claimed is:

1. A method for beam coordination between base stations in wireless cellular systems, wherein at least one user terminal connected to at least a first base station suffers interference from at least a second base station, said first and second base stations comprising advanced beamforming capabilities including a large number of antennas, the beamforming capabilities conforming a radiation pattern towards connected users according to a discrete set of beamforming possibilities, the method comprising:
    transmitting, by each base station, a corresponding encoded value as a beam indicator through a physical beam indicator channel to all the users terminals connected to the base station,
        wherein the physical beam indicator channel characterizes an actual beam in use by the base stations for transmission towards a given user,
        wherein the beam indicator is different for each of the connected users terminals in a way of exploiting the beamforming capabilities in a cell;
    creating, at the at least one user terminal, a first interference report including at least an identity and a beam indicator of the second base station,
        wherein the identity is acquired by decoding a corresponding synchronization or broadcast channel; and
        wherein the beam indicator is obtained from decoding a physical beam indicator channel transmitted by the second base station;
    sending, by the at least one user terminal, the first interference report to the first base station;
    creating, by the first base station with the received first interference report, a second interference report including at least information of the at least one user terminal, of the second base station and of the obtained beam indicator, the second interference report being dynamically updated according to the receiving of the first interference report; and
    coordinating time and/or frequency resources, by the first base stations, between their own beam and the beam of the second base station identified in the second interference report, so that only beams causing interference are involved in the beam coordination process.

2. The method according to claim 1, comprising creating the first interference report by all the user terminals connected to the first base station, the first interference reports including information regarding the identity and the beam indicator of each interfering base station.

3. The method according to claim 1, wherein the second interference report is created based on the first interference report received from connected users terminals.

4. The method according to claim 1, wherein the first interference report is sent either periodically every certain period of time or upon request of the first base station.

5. The method according to claim 1, wherein the first interference report comprises a Layer-3 control message.

6. The method according to claim 5, wherein the Layer-3 control message is sent as a single message or as part of an existing control message.

7. The method according to claim 1, wherein the second interference report is created by the first base station in the form of a table.

8. The method according to claim 7, wherein the table comprises entries with identified interference relationships, the entries containing, for an interfered user and an interfering base station, the related beam indicator.

9. The method according to claim 1, wherein the beam indicator comprises at least a number of coordinates or a set of coordinates in a coordinate system.

10. The method according to claim 9, wherein the beam indicator is protected with a channel encoder for improved detection and scrambled with a sequence dependent on a cell identity for cell differentiation.

11. The method according to claim 1, wherein said dynamically updating comprises adding or removing entries in the second interference report according to the receiving of the first interference report.

12. A system for beam coordination between base stations in wireless cellular systems, the comprising:
    at least one user terminal;
    at least a first base station; and
    at least a second base station;
    wherein the at least one user terminal is connected to the first base station and suffers interference from the second base station, the first and second base stations being equipped with a large number of antennas so as to have advanced beamforming capabilities, wherein:
        the base stations are configured to transmit a corresponding encoded value as a beam indicator through a physical beam indicator channel to all the users terminals connected thereto,
            the physical beam indicator channel characterizing an actual beam in use by the base stations for transmission towards a given user,
            the beam indicator being different for each of said connected users terminals in a way of exploiting the beamforming capabilities in a cell;
        the at least one user terminal comprises a processor configured to:
            create a first interference report including at least an identity and a beam indicator of the second base station; and
            send the first interference report to the first base station; and
        the first base station comprises a processor configured to:
            create with the received first interference report a second interference report that includes at least information of the user terminal and of the second base station and its beam indicator, the second interference report being dynamically updated according to the receiving of said first interference report; and
            coordinate time and/or frequency resources between their own beam and the beam of the second base station identified in the second interference report, so that only beams causing interference are involved in the beam coordination process.

13. The system according to claim 12, wherein the second base station creates the second interference report based on the first interference report received from its connected user's terminals.

14. A non-transitory computer readable medium for beam coordination between base stations in wireless cellular systems, wherein at least one user terminal connected to at least a first base station suffers interference from at least a second base station, said first and second base stations comprising advanced beamforming capabilities including a large number of antennas, the beamforming capabilities conforming a radiation pattern towards connected users according to a discrete set of beamforming possibilities, the readable medium comprising code for causing at least one computer to:

transmit, by each base station, a corresponding encoded value as a beam indicator through a physical beam indicator channel to all the users terminals connected to the base station,
- wherein the physical beam indicator channel characterizes an actual beam in use by the base stations for transmission towards a given user,
- wherein the beam indicator is different for each of the connected users terminals in a way of exploiting the beamforming capabilities in a cell;

create, at the at least one user terminal, a first interference report including at least an identity and a beam indicator of the second base station,
- wherein the identity is acquired by decoding a corresponding synchronization or broadcast channel; and
- wherein the beam indicator is obtained from decoding a physical beam indicator channel transmitted by the second base station;

send, by the at least one user terminal, the first interference report to the first base station;

create, by the first base station with the received first interference report, a second interference report including at least information of the at least one user terminal, of the second base station and of the obtained beam indicator, the second interference report being dynamically updated according to the receiving of the first interference report; and coordinate time and/or frequency resources, by the first base stations, between their own beam and the beam of the second base station identified in the second interference report, so that only beams causing interference are involved in the beam coordination process.

* * * * *